(12) United States Patent
Lassota

(10) Patent No.: US 6,626,085 B1
(45) Date of Patent: Sep. 30, 2003

(54) FOOD INGREDIENTS GRINDER REMOVABLE INGREDIENT HOPPER AND METHOD

(75) Inventor: Zbigniew G. Lassota, Long Grove, IL (US)

(73) Assignee: Food Equipment Technologies Company, Inc., Lincolnshire, IL (US)

( * ) Notice: Subject to any disclaimer, the term of this patent is extended or adjusted under 35 U.S.C. 154(b) by 0 days.

(21) Appl. No.: 10/030,021

(22) PCT Filed: Apr. 28, 2000

(86) PCT No.: PCT/US00/11379

§ 371 (c)(1), (2), (4) Date: Dec. 26, 2001

(87) PCT Pub. No.: WO00/65969

PCT Pub. Date: Nov. 9, 2000

Related U.S. Application Data

(60) Provisional application No. 60/132,127, filed on Apr. 30, 1999.

(51) Int. Cl.[7] .................................................. A47J 31/42
(52) U.S. Cl. .............................. 99/286; 99/510; 241/28; 241/36; 241/100; 241/6
(58) Field of Search ........................ 99/286, 510, 287, 99/348; 241/6, 27, 28, 34, 36, 100, 259.1, 261.2, 285.2

(56) References Cited

U.S. PATENT DOCUMENTS

| | | | |
|---|---|---|---|
| 1,141,898 A | 6/1915 | Merritt | |
| 2,090,634 A | 8/1937 | Meeker | 83/18 |
| 2,229,031 A | 12/1937 | Anderson et al. | 83/18 |
| 2,138,204 A | 11/1938 | Rable | 83/18 |
| 3,744,729 A | 7/1973 | Ackerman | 241/239 |
| 4,789,106 A | 12/1988 | Weber | 241/101.2 |
| 4,947,946 A | 8/1990 | Konishi et al. | 177/105 |
| 4,967,649 A | * 11/1990 | Ephraim et al. | 99/286 |
| 4,971,259 A | 11/1990 | Nidiffer | 241/34 |
| 5,186,399 A | 2/1993 | Knepler et al. | 241/34 |
| 5,241,898 A | * 9/1993 | Newnan | 99/280 |
| 5,465,650 A | * 11/1995 | Friedrich et al. | 99/286 |
| 5,671,657 A | * 9/1997 | Ford et al. | 99/286 |
| 5,718,163 A | 2/1998 | Termini | 99/286 |
| 6,057,514 A | 5/2000 | Maguire | 177/105 |
| 6,298,769 B1 | 10/2001 | Stettes et al. | 99/289 R |

* cited by examiner

Primary Examiner—Reginald L. Alexander
(74) Attorney, Agent, or Firm—James W. Potthast; Potthast & Associates

(57) ABSTRACT

A food ingredient grinding assembly (10) with a removable ingredient hopper (32, 34) made of translucent material to enable viewing the ingredient within the hopper through a window opening (40, 42) and carries a closure assembly (FIGS. 4A and 4B) that automatically closes an outlet opening (112) when the hopper is removed from the housing (12) and when installed is controlled by a solenoid (118) that when energized pushes a plate (116) to align an opening (126) in the plate with the outlet opening (112) of the hopper. When the solenoid is not energized or when the hopper is removed, a spring (118) automatically returns the plate to a closed position. Because the closure assembly (114) is carried by the hopper and the solenoid is not attached to the closure assembly by fasteners the hopper may be removed without the use of any tools simply by lifting it out of the housing.

63 Claims, 5 Drawing Sheets

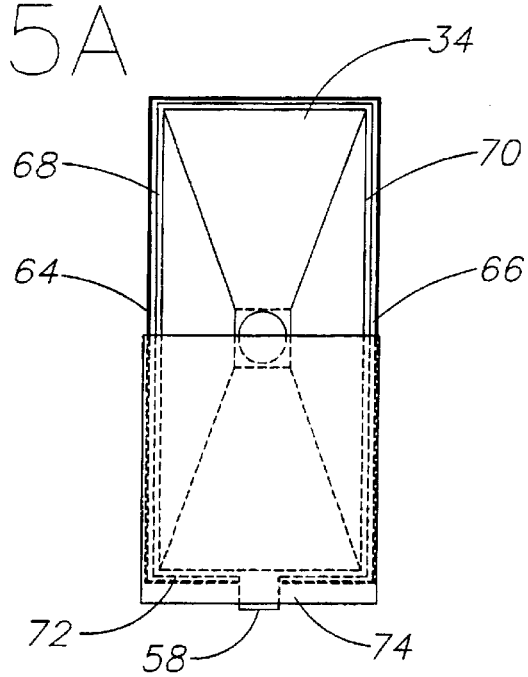
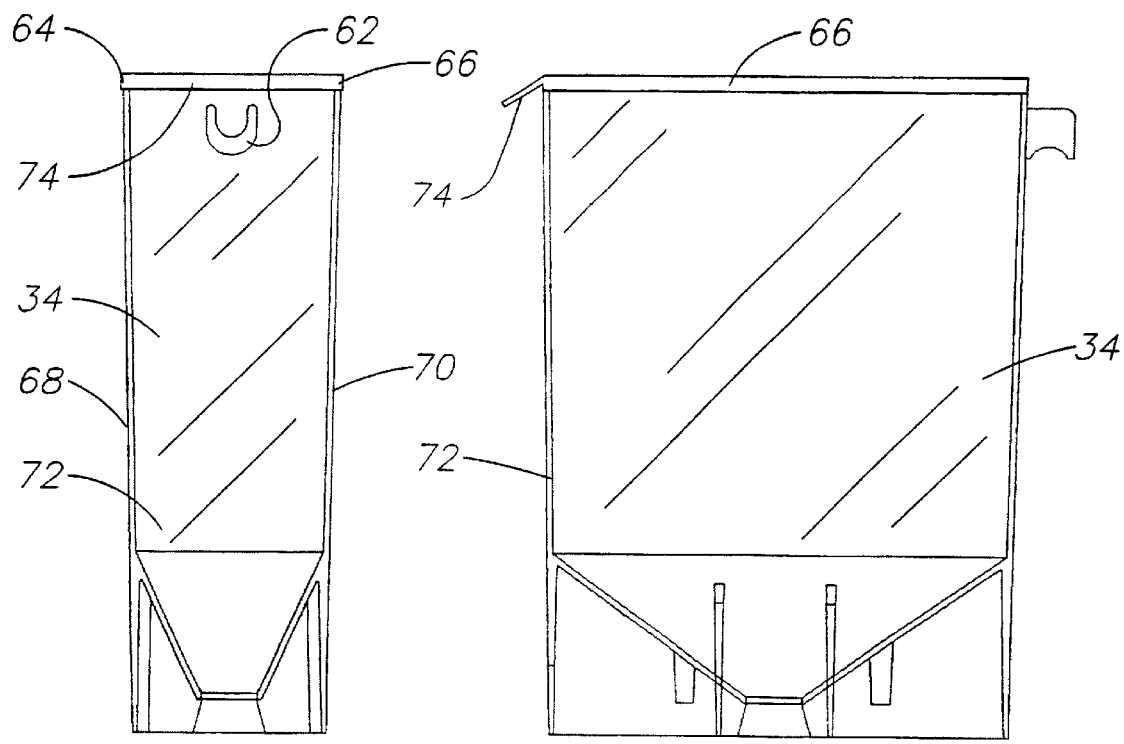

FOOD INGREDIENTS GRINDER REMOVABLE INGREDIENT HOPPER AND METHOD

This application claims benefit to U.S. Provisional Application No. 60/132,127, filed Apr. 30, 1999 under 35 USC 119(e).

BACKGROUND OF THE INVENTION

1. Field of the Invention

This invention relates to electrically powered food processing equipment, generally, and, more specifically, to a food ingredient grinder and ingredient hopper and methods of grinding food ingredient, such as coffee beans.

2. Discussion of the Prior Art

Food ingredient grinders of the type designed to grind food ingredient, such as coffee beans, are well known. Modern coffee grinders, such as the FETCO GR Series coffee grinders sold by Food Equipment Technologies Company, Inc., assignee of the present invention, have a support frame to which are mounted at least one ingredient hopper for containing a supply of the ingredient, i.e. whole coffee beans that have not been ground, or are unground. In the case of the FETCO GR-1 and GR-3 coffee grinders, there is only one hopper, respectively, having capacities of six and twenty pounds of coffee beans to be ground in preselected amounts from 1–3 pounds. The beans are dropped out of an outlet at the bottom of the hopper during a preselected time period that an electronically controlled closure of a hopper outlet opening, or hopper outlet, at the bottom of the hopper is opened. The coffee beans fall through the hopper until the approximate amount of preselected quantity of coffee beans has passed through the opening.

In the case of the FETCO GR-2 coffee grinder, there are two separate hoppers that have separately controlled closures and which are capable of mixing the beans of different types of coffee beans in the same grind or to alternatively and selectively grind different types of coffee, such as caffeinated and uncaffeinated. In such case, the whole coffee beans are passed through a Y-shaped manifold with two inlets, one from each of the two separate hoppers, that passes the mixture through a single manifold outlet opening, or manifold outlet, through a shared, common input to a shared, common grinding chamber. An electronically controlled gating system fixedly mounted within the housing is used to selectively open one or the other of the two hoppers to deposit coffee beans into the grinding chamber. In the case of a single hopper, there is no need for a manifold or a gating system and the coffee beans pass directly into the grinding chamber through a direct, or I-shaped, hopper outlet conduit that is likewise fixedly mounted within the housing.

The coffee beans pass from the I-shaped hopper outlet conduit or pass from the Y-shaped manifold outlet, to the grinding chamber within which are contained intermeshing grinding blades, or grinding wheels, that receive whole coffee beans at the upper inlet to the chamber to be ground. The whole beans are ground by the rotating grinding blades and then are passed through the grinding blades to a grinding chamber outlet, or grinder outlet.

Beneath the grinder outlet is located a brew basket with a conforming filter paper within which is received the freshly ground coffee. The brew basket is removed after the grinding cycle has ended and after all of the preselected coffee is contained within the brew basket. The brew basket is then removed from the grinder and attached to a coffee brewer where hot water is passed through the freshly ground coffee to brew hot coffee. Once one brew basket is removed from the grinder another can take its place and another grinding cycle can commence.

A portion of the front wall of the housing, which also forms a wall of the hopper, has a plastic, transparent or translucent window. The window enables the operator to view when the hopper is low and needs to be refilled with more beans without having to open the hopper lid and to view inside to do so. The hoppers are permanently mounted within, and integrally formed together, in part, with a housing of the grinder assembly within which all of the elements of the coffee grinder are protectively contained. Accordingly, the hoppers must be filled in place within the housing by opening a lid covering the open top of the hopper, lifting a bag or other container of coffee beans and dumping them into the open top of the hopper.

If it is desired to change the type of coffee contained within a hopper, say from mocha java coffee to kona coffee, then the hopper must be emptied of the one before the other is introduced, unless it is desired to mix them together. In the case of any one hopper, it is not possible to change the coffee that is introduced into the grinding chamber from that one hopper without first having the one hopper emptied. There is no convenient way of emptying the hopper except by grinding the coffee until all of the beans in the hopper have been ground. Consequently, in the case of a single hopper system, it is also not possible to easily change from one type of coffee to another. In such case, separate grinders are needed for grinding different types of coffees that are required during the same period.

Coffee dust and other coffee constituents from the grinding process and also from the beans themselves stick to the walls of the hopper. Accordingly, even when the beans of one type are removed from the hopper and another type added in its place, there is still some residual coffee of the one type or types previously contained within the hopper that can contaminate the current coffee contained within the hopper. There is no way of conveniently cleaning the hopper. Disadvantageously, while the hopper is being cleaned, the grinding assembly cannot be used. With the hopper in place over the manifold and the grinding chamber, there is no convenient access to these elements for operator cleaning or operator service. The hoppers are in the way and can only be removed with the use of tools needed to disconnect the hopper from the outlet closure gate or disconnecting the linkage with the gate control solenoid that is connected with the outlet closure gate.

SUMMARY OF THE INVENTION

In accordance with the present invention, the disadvantages of known coffee grinder assemblies and hoppers and known grinding methods for food ingredients, such as coffee, are overcome by provision of a gating system and other features that enable the hoppers to be readily removed or replaced for purpose of cleaning and for enabling the changing between different types of ingredient to be ground by interchanging the hoppers that contain the different types of ingredient and by other advantageous features and methods that are described here.

In accordance with one aspect of the invention a grinder assembly for grinding a food ingredient and having a frame, a protective housing mounted to the frame, a grinding chamber containing at least one powered grinding member mounted to the frame within the housing, is provided with a removable hopper assembly having a removable ingredient hopper for holding ingredient to be ground, said ingredient hopper having an open top for receipt of ingredient to be ground, a bottom with an electronically controllable hopper outlet opening for controlled passage of the ingredient into the grinding chamber, and opposite hopper sides extending between the open top and the outlet opening, and an electronic hopper outlet control assembly for selectively controlling closure of the hopper outlet, and a tool-less removable mounting assembly for releasably mounting the hopper to the frame and within the housing and in tool-less releasable operative engagement with the electronic control assembly to enable manual, tool-less removal of the hopper from the frame to without the housing, whereby the controlled hopper is readily manually removable from the housing for hopper replacement, ingredient reloading or cleaning without the need for tools to disconnect the hopper from the electronic control assembly.

In accordance with another aspect of the invention a method is provided for grinding with a grinder assembly having means for grinding a food ingredient and having a frame, a protective housing mounted to the frame, a grinding chamber containing at least one powered grinding member mounted to the frame within the housing, by performing the steps of placing ingredient to be ground into a removable ingredient hopper, said ingredient hopper having an open top for receipt of ingredient to be ground, a bottom with an electronically controllable hopper outlet opening for controlled passage of the ingredient into the grinding chamber, and opposite hopper sides extending between the open top and the outlet opening, and releasably mounting the hopper with ingredient within the housing and with a closure member of the electronically controlled hopper outlet opening in positional relationship with an electronic hopper closure control member mounted within the housing, and selectively controlling closure of the hopper outlet with an electronic hopper closure member to pass unground ingredient to the grinding chamber, and grinding the ingredient that is passed to the grinding chamber from the hopper outlet.

In accordance with yet a further aspect of the invention, a grinder assembly for grinding a food ingredient and having a frame, a generally opaque protective housing mounted to the frame and having a window opening for viewing into the housing, a grinding chamber containing at least one powered grinding member mounted to the frame within the housing, is provided with a removable hopper assembly comprising a removable ingredient hopper with at least a portion defining a translucent window area that is carried by the ingredient hopper to enable viewing into the ingredient hopper, and a hopper mounting assembly for aligned mounting of the hopper inside the housing in an operative aligned relationship with respect to the grinding chamber, and with at least a portion of the translucent window area of the hopper aligned with the window opening in the housing to enable viewing into the hopper through the window opening and the translucent area aligned with the window from outside of the housing when the hopper is mounted inside the housing, said mounting assembly being configured to enable the tool-less, manual removal of the hopper with translucent window from the frame and housing, whereby the hopper with translucent window is readily removable for hopper replacement, ingredient replacement repair or cleaning.

Pursuant to a further aspect of the invention a method for grinding ingredient is provided for use with a grinder assembly for grinding a food ingredient and having a frame and a grinding chamber with powered grinding blades mounted to the frame comprising the steps of placing a load of unground ingredient into an ingredient hopper with a translucent window, and releasably mounting the hopper containing the unground ingredient inside a housing with the translucent window aligned with a window opening in the housing to enable viewing into the hopper through the window from outside of the housing when the hopper is mounted inside the housing, and dropping unground ingredient from the hopper to a grinding chamber containing powered grinding blades to grind the ingredient, and grinding the unground ingredient in the grinding chamber.

The object of the invention is also achieved by providing a food ingredient hopper assembly adapted for use with a food grinder assembly with a manually portable, removable, container shaped body for containing a supply of ingredient to be ground by a mating grinding assembly with which the body is dimensioned for releasable mounted engagement, and a hopper outlet opening at the bottom of the container shaped body, and a hopper outlet closure assembly mounted to the body adjacent to the hopper outlet opening and having a closure member, and a mounting assembly attached to the body for mounting the closure member for movement between a closed position in which the outlet member is blocked closed by the closure member, and an open position in which the closure member is clear of the outlet opening.

Likewise, the object of the invention is achieved in part by providing a food ingredient hopper assembly adapted for use with a food grinder assembly having a manually portable, removable, container shaped body for containing a supply of ingredient to be ground by a mating grinding assembly with which the body is dimensioned for releasable mounted engagement, said body having an open top, a bottom with a hopper outlet opening and opposite sides that extend between the open top and the outlet opening, at least one support member extending laterally from at least one of the opposite sides of the body adjacent the open top, said at least one support member having an underside positioned vertically relative to the hopper outlet opening for hanging support of the hopper body from an underlying mating support member of the grinder assembly with the hopper outlet opening in the correct outlet position within the grinder assembly.

Accomplishment of the invention is also accomplished in part by provision of a method of grinding with a food ingredient grinder having a grinding chamber and a hopper for containing a supply of unground food ingredient to be passed to the grinding chamber for grinding by performing the steps of removably mounting the hopper to the housing by hanging the hopper from laterally extending mounting members that extend laterally from the sides of the hopper, manually removing the hopper from the housing by manually lifting the hopper by the laterally extending mounting members, and using the laterally extending mounting members as handles to manually carry the hopper to a location spaced from the housing for cleaning or reloading with ingredient. Preferably, the mounting members have downwardly turned portions to facilitate mounting and use as handles.

BRIEF DESCRIPTION OF THE DRAWINGS

The forgoing objects and advantageous features of the invention will be explained in greater detail and others will be made apparent from the detailed description of the preferred embodiment of the present invention that is given with reference to the several figures of the drawing, in which:

FIGS. 5A, 5B and 5C are respectively plan, front elevational and side elevational views of the hopper removed from the grinder assembly and being supported on a counter top.

DESCRIPTION OF THE PREFERRED EMBODIMENT

Figure 1:
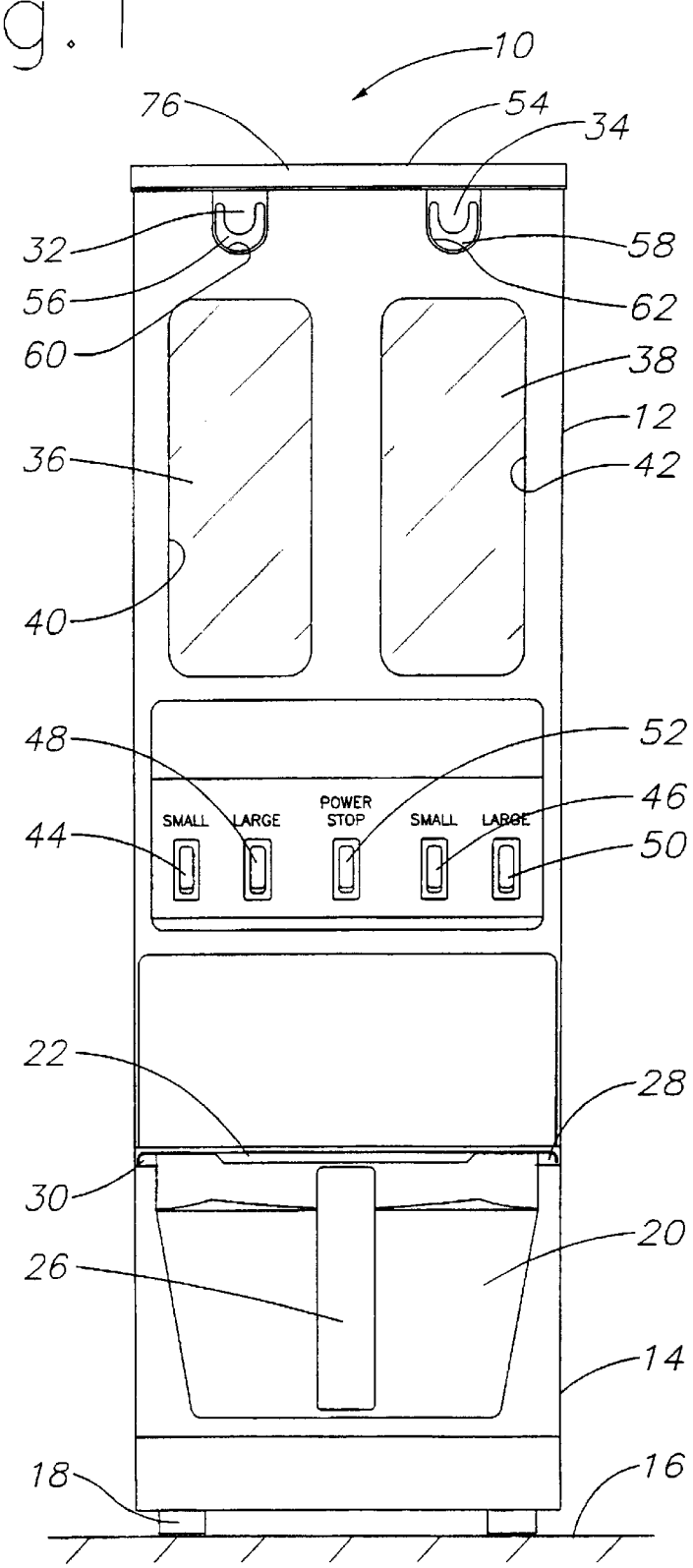
FIG. 1 is a front elevational view of a preferred embodiment of the grinding assembly of the present invention.

Referring first to FIG. 1, the preferred embodiment of the grinder assembly 10 of the present invention is seen to have a stainless steal housing 12 supported on a frame including a base 14 which, in turn, is supported above a counter top 16 by legs 18. A brew basket 20 with an open top 22, a container shaped body 24 and a handle 26 attached to the side of the body 24 is centrally located beneath the housing 12 to receive ground coffee through the open top 22.

The brew basket 20 is releasably mounted to the underside of the housing 12 by means of peripheral flanges 28 that slideably ride on rails 30 mounted beneath the housing 12. Before a grinding cycle, the brew basket with a coffee filter must be first mounted beneath the grinder outlet as shown. After the grinding cycle, the brew basket 20 is removed with the ground coffee and installed in a brewer (not shown) where hot water is passed through the ground coffee prepared freshly brewed coffee.

The grinding assembly 10 preferably includes a pair of substantially identical hoppers, a left hopper 32 and a right hopper 34. Both hoppers have translucent portions 36 and 38 that are aligned with window openings 40 and 42 in the front of the housing 12. The controller for the grinder assembly, which forms no part of the present invention, has two pairs of grind start switches 44 and 46 for control of grinding of coffee from the left hopper 32 and the right hopper 34, respectively. Actuation of start switches 44 and 46 causes the grinder to grind preselected, relatively small amounts of coffee from the left and the right hoppers, respectively, while actuation of switches 48 and 50 results in the grinder assembly 10 grinding relatively large preselected amounts of coffee. Actuation of a power stop switch 52 terminates all grinding from either hopper. For further information concerning the controller, reference should be made to my copending application Ser. No. 09/397,834, filed Sep. 17,1999 and entitled "Food Ingredient Grinder Assembly and Method", which is hereby incorporated by reference.

The grinder assembly 10 also has a hinged top lid 54 that overlies the open tops of the hoppers 32 and 34. The lid is normally kept closed during operation but is opened to install the hoppers themselves, or coffee beans into the hoppers 32 and 34, into the housing 12. Pairs of arcuately shaped hopper handles 56 and 58 (only one shown of each pair) extend outwardly from the fronts and backs of hoppers 32 and 34, respectively. The handles are located adjacent the tops of hoppers 32 and 34, and due to their arcuately shaped lower surfaces, are readily guided into their associated mounting slots 60 and 62. The arcuately shaped bottom surfaces of the handles are supported within the slots by correspondingly shaped, arcuately shaped bottom surfaces of the mounting slots in the front of the housing 12. These handles, in addition to facilitating manual mounting and removal of the hoppers from the housing, assist in the releasable mounting and support of the hoppers 32 and 34 in proper alignment within the housing 12 for proper interaction with the other elements of the hopper assembly.

Figure 2:
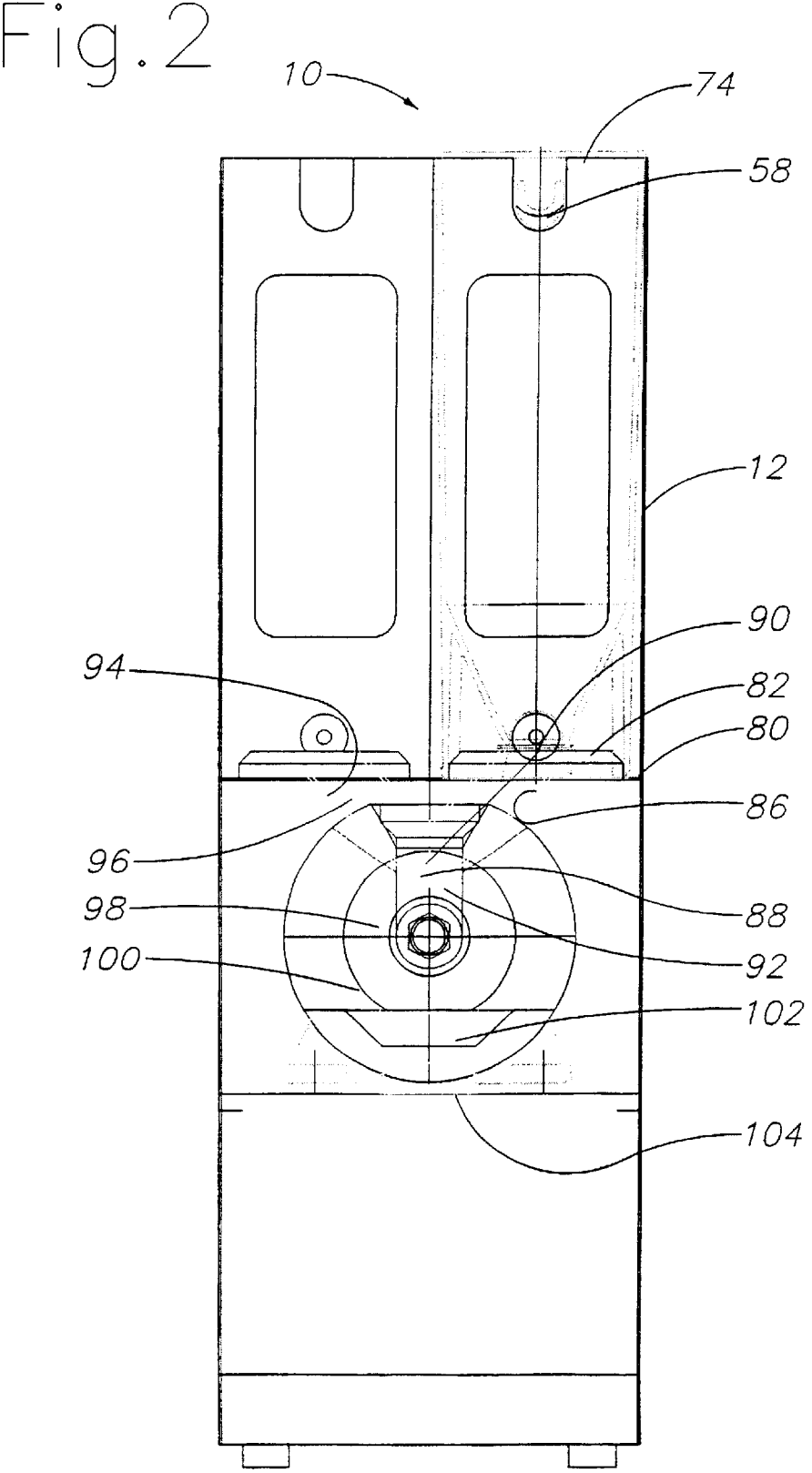
FIG. 2 is sectional, partially schematic, front elevational view of the grinder assembly of FIG. 1 but with the left hopper removed and showing the details of the releasable and removable mounting of the right hopper within the housing supported by the upper edges of the housing side walls of the grinder assembly and also showing the manifold, the grinding chamber, the grinding wheel and the grinding chamber outlet.

Referring now to FIG. 2, the grinder assembly 10 is seen with the left hopper 32 removed from within the housing. Preferably, the hoppers 32 and 34 are both made of translucent, impact resistant plastic that is integrally molded together with the handles 56 and 58. Accordingly, there is no need for there to be any other translucent window material permanently mounted to the housing and filling the window openings 40 and 42. The window openings are preferably free of any material, in order to facilitate access to the interior of the housing 12 for cleaning, maintenance or repair and to eliminate the cost of such additional translucent material.

As best seen in FIGS. 5A–5C, the hoppers have laterally extending, side mounting members 64 and 66 that extend laterally from the opposite, relatively long, side walls 68 and 70 of hopper 74 and another laterally extending forward mounting member 74 extending laterally outwardly from the front wall 72. The laterally extending mounting members are supported by the top edges of the housing side and front walls, and, in the case of the of a double hopper grinding system such as shown her, the interior side of the hopper is supported by the edge of a support bar 80, FIG. 1. The support bar 80 is located at the same level as that of the top edges of the side and front walls of the housing, extends from the front to the back of the housing, and functions as an underlying support member. In the case of a single hopper system in which only one hopper is provided, there is no need for the support bar 80, for the hopper extends across the entire housing, and the side wall support members of the hopper are both supported by the upper edges of the opposite side walls of the housing.

In the case of the forward support member 74, in addition to extending laterally outwardly from the front wall, it has a canted portion that extends at an acute angle downwardly along the front wall 72. This downwardly canted portion restrains the top of the hopper 32 against relative lateral movement while also guiding the hopper into correct alignment with the front wall top edge. Once in place, the forward support member 74 also restrains the hopper against rearward movement. The downwardly extending portions of the support members also facilitates their use in accordance with the invention as handles for manually installing, removing and otherwise handling the hopper.

As seen in FIG. 2, the top lid 54 also has a forward extending portion 76 that overhangs the forward mounting member 74 to facilitate use of the extending portion 76 as a handle for lifting and lowering the front part of the hinged body of the lid 54. The portion 76 extends beyond and overlies the entirety of the mounting member to enable the underside surface to be manually engaged without being blocked by the mounting member 74. After the lid is pivoted up and out of the way to an open position, then the mounting member 76 is accessible for lifting the hopper out of the housing 12.

Referring again to FIGS. 2 and 3, the housing has a shelf 80 upon which is supported a hopper support outlet pad 82 with a pair of cylindrical support elements 84 mounted fore and aft to the frame of the grinding assembly 10. The hopper support outlet pad 82 has a canted passageway 86 through which extends an intake pipe of a Y-shaped manifold 88 that passes coffee beans received at its inlet 90 to a common outlet 92 that is shared with another canted outlet passageway 94 that extends into the other intake pipe 96 of the Y-shaped intake manifold 88.

The coffee beans fall from the common outlet 92 into a grinding chamber 98 with powered, intermeshing grinding discs that are driven by an electrical motor 100. The ground coffee then falls trough an outlet chute 102. The outlet chute 102 has a flared outlet opening 104 that faces the open top of the brew basket 20A and the ground coffee fall into the filter paper within the brew basket. The brew basket 20 is then removed an mounted to a brewer for the brewing of coffee and a new, empty brew basket is substituted in its place to receive the next batch of freshly ground coffee.

The removable unground ingredient hoppers 34 and 35 when mounted inside the housing 12 enable viewing inside through the window openings 40 and 42 from outside of the housing when the hoppers are mounted inside the housing. The window openings 40 and 42 are generally unblocked and generally open when the ingredient hoppers are not mounted within the housing 18.

Preferably, the entire bodies of the removable hoppers are made of translucent or transparent plastic such that the window 36. When the entire ingredient hopper is made of translucent material the portion of the side of the hopper that aligns with the window opening is the window. Alternatively, the windows are only provided at the locations of the window openings.

Figure 3:
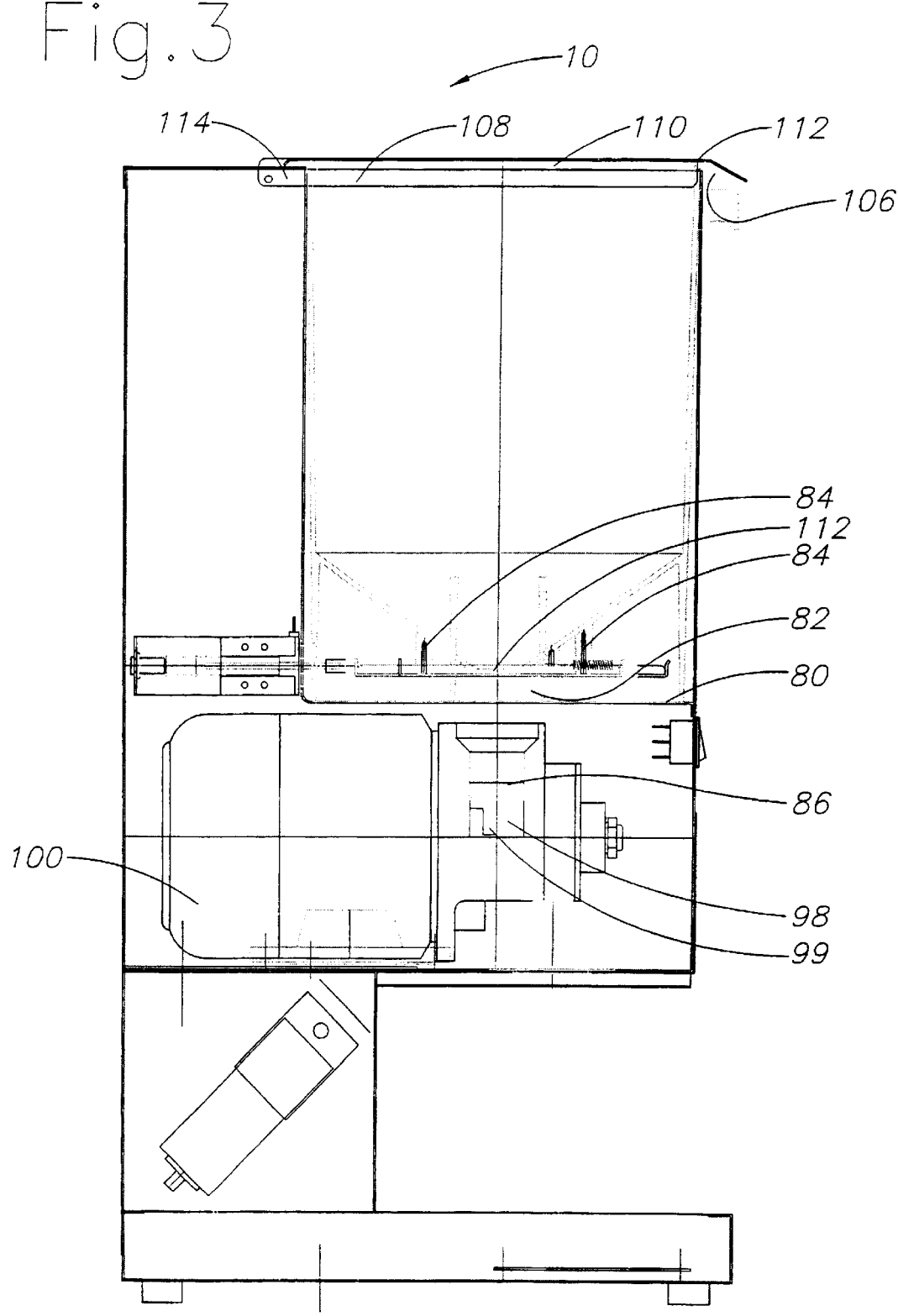
FIG. 3 is a sectional side view of the grinder assembly taken along section line III—III of FIG. 2.

As best seen in FIG. 3, the ingredient hoppers 32 and 34 each have a mounting member or flange 106 integrally formed together with the hopper body and the window, that is located adjacent the open top 108 of the ingredient hopper. The flange 106 extends laterally outwardly from the sides and around the perimeter of the open top 108 for hanging the hopper from a mating underlying support member 110 located adjacent the top of the housing 12. The flange 108 is downwardly turned and extends downwardly along the perimeter of the open top alongside the side of the housing to restrain the hopper against lateral movement relative to the housing 12. A housing cover 112, is hingedly by pivot pins connected to the hopper assembly housing, and is used to close the open top of the housing.

In keeping with an important aspect of the invention, the mounting of the hoppers 32 and 34 within the housing 12 and removal from the housing is accomplished manually without the need for any tools.

Figure 4A:
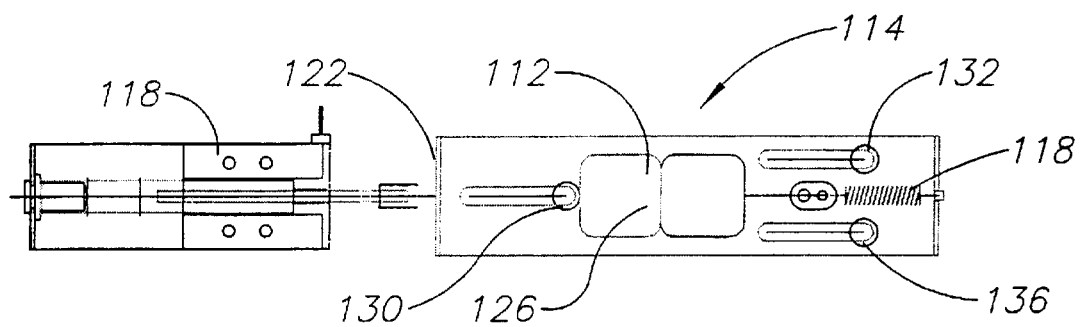
FIGS. 4A and 4B are sectional plan views of the hopper outlet gate assembly taken along view lines IV—IV of FIG. 3 with the gate in the closed position, as shown in FIG. 3, and in the open position, respectively.
Figure 4B:
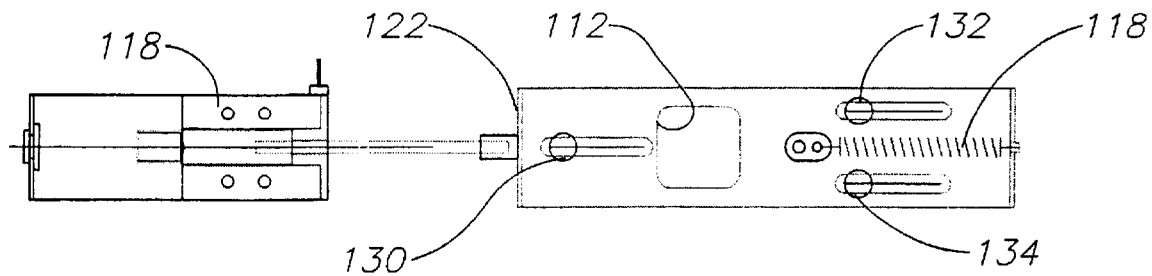

Referring now to FIGS. 3, 4A, and 4B, the ingredient hoppers each have an outlet opening 112 for passage of the ingredient from the hopper into the grinding chamber. The outlet opening 112 has a outlet closure assembly 114 that automatically closes the outlet opening 112 when the hopper is removed from the frame 20 which prevents spillage of the ingredient. When the hopper is removed for cleaning, loading or replacement with another hopper containing a different ingredient, from the frame 12 the closure assembly 114 automatically closes the hopper outlet opening 112 in response to removal from the housing. This prevents spillage of any unground ingredient into the housing or elsewhere and enables removal by the users as needed.

The outlet closure assembly 114 includes a closure member, or cover plate 116 that is mounted to the hopper for movement between a closed position, in which the hopper outlet opening 112 is covered by the cover plate 116, and an open position in which the hopper outlet opening 112, is uncovered. The cover plate 116 is biased for movement from the closed position, as seen in FIG. 4A, and the open position, as seen in FIG. 2C with a spring 118.

Within the hopper assembly housing is a solenoid 120 for selectively resisting the spring to move the cover plate 116 from the closed position to the open position. When the solenoid 118 is energized, a solenoid plunger, or pin, 120 is extended from the solenoid 118 and pushes on an upturned side 122 of the cover plate 116 to move the cover plate to the open position, as shown in FIG. 4B. In the open position, an opening 126 in the plate 116 aligns with the outlet opening 112 to allow the passage of ingredient. When the solenoid 48 is deenergized, the pin retracts, as shown in FIG. 4A, and the spring 118 automatically returns the cover plate 116 to the closed position. In the closed position the outlet opening 112 is not aligned with the opening 126 and passage of ingredient is blocked by the plate 116. The plate is guided in its sliding movement by posts 130, 132 and 134 within mating guide slots in the plate 116.

Referring now to FIGS. 2 and 3, in accordance with the method of the invention for grinding a food ingredient, such as coffee beans, in a grinder assembly 10 having a frame 12 and a grinding chamber 98 with powered grinding blades mounted within a generally closed opaque housing and having a window opening for viewing into the hoppers, includes the step of placing a load of unground ingredient into an ingredient hopper 32 or 34 with a translucent window 36 or 38, respectively, and releasably mounting the ingredient hopper containing the unground ingredient inside the housing with the translucent window aligned with the window opening in the housing 12. This enables viewing into the ingredient hopper through the window opening from outside of the housing when the ingredient hopper is mounted inside the housing 12. The method includes the step of selectively opening an outlet opening of the ingredient hopper to drop unground ingredient from the ingredient hopper to the grinding chamber 98 containing powered grinding blades 99 to grind the ingredient.

Upon completion of grinding the ingredient the method includes the step of removing the ingredient hopper from within the housing after depletion of the unground ingredient and cleaning the ingredient hopper of any residual material. The ingredient hopper is then refilled with another load of unground ingredient of a different type, such as decaffeinated coffee versus non-decaffeinated coffee, and remounted-inside the housing with the translucent 26 window aligned with the window opening to grind the other load. Alternatively, instead of cleaning, the hopper is not cleaned but is refilled with the same type of ingredient. Alternatively, a partially filled hopper is removed before it is empty and replaced with another hopper containing a different type of ingredient.

Upon removal of the ingredient hopper the window opening the window are unblocked and open. The remounting of the ingredient hopper is performed by hanging the ingredient hopper with a mounting member, or flange 106, which laterally extends outwardly from the top of the ingredient hopper along the perimeter of the open top. The flange has a downwardly turned portion that extends downwardly alongside a portion of the side of the housing to restrain the ingredient hopper against lateral movement relative to the housing.

As explained above, the hopper has an open top for receipt of ingredient to be ground and a bottom with an outlet opening for passage of the ingredient into the grinding chamber. In accordance with the method of the invention, the outlet opening is automatically closed by a closure member, or cover plate, of a closure assembly 42 mounted to and carried by the ingredient hopper when removed. The closure member automatically closes the outlet opening when the ingredient hopper is removed from the frame. The hopper is not blocked from removal by any fasteners of any kind and may be removed without tools by simply lifting the hopper out of the housing. In accordance with the method, the closure assembly selectively moves the cover plate between a closed position, as seen in FIG. 2B, in which the hopper outlet opening is covered by the cover plate and an open position in which the unground ingredient is allowed to pass through the hopper outlet opening when the ingredient hopper is mounted within the housing.

Upon completion of the grinding of the ingredient, the closure assembly automatically moves the cover plate to a closed position, as seen in FIG. 2C in which the unground ingredient is prevented from passing through the hopper outlet. The opening and closing of the cover plate of the closure assembly includes the steps of spring biasing the closure member for movement to the closed position, and selectively overcoming the biasing force of the spring to move the cover plate to the open position. The step of selectively overcoming the biasing force includes the step of selectively energizing a solenoid to move the cover plate to the open position as seen in FIG. 2C.

Significantly, the solenoid plunger is not connected to the plate but merely pushes the cover plate to resist the spring biasing means and push the cover plate to the open position whenever the solenoid is energized.

Another aspect of the invention is achieved by providing the step automatically closing the outlet opening when the ingredient hopper is removed from the frame by biasing the spring to automatically move the cover plate into the closed position when the ingredient hopper is removed from the hopper assembly.

While a particular embodiment has been disclosed in detail to illustrate the invention it should be appreciated that many variations may be made without departing from the spirit of the invention, the scope of which is defined in the following claims.

What is claimed is:

1. In a grinder assembly for grinding a food ingredient and having a frame, a protective housing mounted to the frame, a grinding chamber containing at least one powered grinding member mounted to the frame within the housing, the improvement being a removable hopper assembly, comprising:

a removable ingredient hopper for holding ingredient to be ground, said ingredient hopper having an open top for receipt of ingredient to be ground, a bottom with an electronically controllable hopper outlet opening for controlled passage of the ingredient into the grinding chamber, and opposite hopper sides extending between the open top and the outlet opening;

an electronic hopper outlet control assembly for selectively controlling closure of the hopper outlet; and a tool-less removable mounting assembly for releasably mounting the hopper to the frame and within the housing and in tool-less releasable operative engagement with the electronic control assembly to enable manual, tool-less removal of the hopper from the frame to without the housing, whereby the controlled hopper is readily manually removable from the housing for hopper replacement, ingredient reloading or cleaning without the need for tools to disconnect the hopper from the electronic control assembly.

2. The grinding assembly of claim 1 in which the electronic hopper outlet control assembly includes a hopper control gate assembly for controlling the passage of ingredient from the hopper to the grinding chamber, said hopper control gate assembly having a hopper outlet gate for selectively closing the hopper outlet, said hopper outlet gate being mounted to the removable hopper and carried by the removable hopper when the hopper is removed to without the housing.

3. The grinding assembly of claim 2 in which the hopper outlet gate includes a closure member,
   a mounting assembly for mounting the closure member to the hopper for movement between
      a closed position in which the outlet opening is blocked closed by the closure member, and
      an open position in which the hopper outlet opening is clear of the closure member and is open for the passage of ingredient, and
   a biasing member for creating a bias force to bias the closure member to move toward the closed position.

4. The grinder assembly of claim 3 in which the electronic hopper outlet control assembly includes a movable closure actuator mounted to the frame within the housing to engage the hopper closure member for selectively overcoming the bias force to move the closure member to the open position.

5. The grinder assembly of claim 4 in which the hopper outlet control assembly includes an electromechanical device to power the closure actuator to move the closure member to the open position.

6. The grinder assembly of claim 5 in which the electromechanical device is a solenoid.

7. The grinder assembly of claim 5 in which the closure actuator is movable to push the closure member to the open position.

8. The grinder assembly of claim 1 in which the hopper is mounted for sliding movement through a removal and mounting path through the housing, and
   the movable closure actuator is spaced from a blocking position in the path when the closure member is in the open position to enable unfettered movement through the path during mounting and removal of the hopper to provide both tool-less and manual interlock-less removal and remounting of the hopper with respect to the housing.

9. The grinder assembly of claim 1 in which the removable mounting assembly includes at least one hopper mounting member extending laterally outwardly from at least one of the opposite sides of the hopper, and
   at least one hopper mounting support member attached to the frame and providing underlying hanging support for the at least one hopper mounting member.

10. The grinder assembly of claim 9 in which the removable mounting assembly includes another hopper mounting member located adjacent the top of the hopper and extending laterally outwardly away from the one of the opposite sides and the one hopper mounting member.

11. The grinder assembly of claim 9 in which the housing has sides surrounding an open top with a top edge and at least a portion of the top edge defines the hopper mounting support member.

12. The grinder assembly of claim 11 in which the hopper mounting member has a portion that engages with one of the opposite sides of the housing adjacent the top edge of the housing to restrain the top of the hopper against lateral movement relative to the housing in one direction.

13. The grinder assembly of claim 12 in which the hopper mounting member has another portion that engages another one of the sides of the housing to restrain the top of the hopper against lateral movement relative to the housing in another direction that is opposite to the one direction.

14. The grinder assembly of claim 11 including two other hopper mounting members that, with the one hopper mounting member, extend from three sides of the open top of the hopper, respectively, to respectively engage top edges of three adjoining sections of the housing side wall for underlying support.

15. The grinder assembly of claim 14 in which each of the three hopper mounting members has a downwardly extending portion to engage the side wall of the housing adjacent the housing open top on three sides to restrain the hopper against movement in three directions.

16. The grinder assembly of claim 15 in which a front side wall of the hopper is engaged by a front of the housing to restrain the hopper against movement in a direction away from a back side wall of the housing and a portion of the hopper mounting member that engages a front side wall of the housing to restrain the hopper against relative movement toward the back side wall.

17. The grinder of claim 11 in which including a housing cover that fits over both the mounting member and the top edge of the open top of the housing to close both the open top of the housing and the open top of the hopper mounted within the housing.

18. The grinder assembly of claim 11 in which the electronic hopper control assembly includes an outlet closure member mounted to the ingredient hopper and means for automatically moving the closure member to a closed position in which the outlet is blocked closed by the closure member whenever the hopper is removed from the frame.

19. The grinder assembly of claim 11 in which the hopper outlet control assembly includes means for automatically closing the hopper outlet opening in response to removal from the housing.

20. The grinder assembly of claim 9 in which the automatic closing means includes a closure member, means for mounting the closure member to the hopper for movement between a closed position in which the hopper outlet opening is covered by the closure member and an open position in which the hopper outlet is uncovered, and a resilient member for biasing the closure member for movement to the closed position.

21. The grinder assembly of claim 20 in which the reslient member is a spring.

22. The grinder assembly of claim 18 in which the electronic control assembly includes means within the housing for selectively resisting the biasing means to selectively move the closure member to the open position.

23. The grinder assembly of claim 22 in which the selectively resisting means includes a solenoid and a switch for selectively energizing the solenoid to selectively resist the biasing means.

24. The grinder assembly of claim 23 in which the solenoid has a pusher member to push the closure member to the open position against resistance by the resilient member.

25. The grinder assembly of claim 24 in which the pusher member pushes against the closure member to move it toward the open position whenever the solenoid is energized.

26. In a grinder assembly for grinding a food ingredient and having a frame, a protective housing mounted to the frame, a grinding chamber containing at least one powered grinding member mounted to the frame within the housing, the improvement being a method of grinding comprising the steps of:

placing ingredient to be ground into a removable ingredient hopper, said ingredient hopper having an open top for receipt of ingredient to be ground, a bottom with an electronically controllable hopper outlet opening for controlled passage of the ingredient into the grinding chamber, and opposite hopper sides extending between the open top and the outlet opening;

releasably mounting the hopper with ingredient within the housing and with a closure member of the electronically controlled hopper outlet opening in positional relationship with an electronic hopper closure control member mounted within the housing;

selectively controlling closure of the hopper outlet with an electronic hopper closure member to pass unground ingredient to the grinding chamber; and grinding the ingredient that is passed to the grinding chamber from the hopper outlet.

27. The method of claim 26 including the step of manually removing the ingredient hopper from within the housing by sliding the hopper with the closure member attached to the hopper out of releasable operative engagement with the electronic control assembly and manually lifting the hopper out of the housing.

28. The method of claim 27 including the steps of replacing the hopper with another hopper substantially the same as the one hopper but containing an ingredient different from the ingredient contained within the one hopper, and selectively controlling the closure member of the other hopper with the electronic hopper closure member to pass the other ingredient from the other hopper to the grinding chamber, and grinding the other ingredient.

29. The method of claim 27 including the steps of cleaning the ingredient hopper after the ingredient hopper is removed from the housing, and releasably remounting the ingredient hopper within the housing after being cleaned.

30. The method of claim 27 including the steps of removing the ingredient hopper from within the housing, and removing the ingredient from the hopper after it is removed, placing another ingredient into the hopper that is different from the one ingredient that is removed, and releasably remounting the ingredient hopper within the housing, and selectively controlling the closure of the hopper outlet to pass the other ingredient to the grinding chamber.

31. The method of claim 27 including the step of automatically moving the closure member to a closed position when the hopper is removed from the frame.

32. The method of claim 31 in which the step of automatically moving the closure member to a closed position includes the step of biasing the closure member for movement to the closed position.

33. The method of claim 32 in which the step of selectively controlling the closure of the hopper includes the step of overcoming the biasing by selectively energizing an electomechanical device to overcome a biasing force of said biasing to move the closure member to the open position.

34. The method of claim 33 in which the electromechanical device has a pusher member that pushes the closure member to overcome the biasing force and move the closure member to the open position.

35. The method of claim 34 in which the pusher member moves the closure member to the closed position only when the electromechanical device is energized.

36. The method of claim 26 in which the step of releasably mounting is performed by inserting the hopper into an open top of the housing and hanging the hopper from the top of the housing with a mounting member extending laterally outwardly from a side of the hopper and overlying an edge of the open top of the housing member in supportive relationship with the edge.

37. In a grinder assembly for grinding a food ingredient and having a frame, a generally opaque protective housing mounted to the frame and having a window opening for viewing into the housing, a grinding chamber containing at least one powered grinding member mounted to the frame within the housing, and the improvement being a hopper assembly, comprising:
   a removable ingredient hopper with at least a portion defining a translucent window area that is carried by the ingredient hopper to enable viewing into the ingredient hopper; and
   a hopper mounting assembly for aligned mounting of the hopper inside the housing
      in an operative aligned relationship with respect to the grinding chamber, and
      with at least a portion of the translucent window area of the hopper aligned with the window opening in the housing to enable viewing into the hopper through the window opening and the translucent area aligned with the window from outside of the housing when the hopper is mounted inside the housing,
      said mounting assembly being configured to enable the tool-less, manual removal of the hopper with translucent window from the frame and housing, whereby the hopper with translucent window is readily removable for hopper replacement, ingredient replacement repair or cleaning.

38. The grinder assembly of claim 37 in which the window opening is entirely empty of any translucent material that is mounted to the housing other than the translucent window when the hopper is mounted within the housing.

39. The grinder assembly of claim 37 in which the translucent window is made of translucent plastic.

40. The grinder assembly of claim 37 in which the translucent window is integrally formed with the hopper.

41. The grinder assembly of claim 37 in which
   the hopper has opposite side portions,
   substantially the entire opposite sides of the hopper are molded from translucent material, and
   the window area is any portion of the opposite-sides of the hopper that aligns with the window opening when the hopper is mounted within the housing, whereby the hopper may be mounted without regard to which of the opposite sides of the hopper is located in alignment with the window opening.

42. The grinder assembly of claim 37 in which
   the hopper has opposite sides and an open top, and
   the hopper mounting assembly includes means for releasably mounting the hopper within the housing for tool-less manual removal.

43. The grinder assembly of claim 42 in which the releasably mounting means includes
   at least one hopper mounting member extending laterally outwardly from at least one of the opposite sides of the hopper, and
   at least one hopper mounting support member attached to the frame and providing underlying hanging support of the at least one hopper mounting member.

44. The grinder assembly of claim 42 in which
   the hopper mounting member is located adjacent the top of the hopper, and
   the mounting hopper support member is a top edge of one of the opposite side walls of the housing.

45. The grinder assembly of claim 43 in which the hopper mounting member is integrally mold ed together with the hopper and the window.

46. In a grinder assembly for grinding a food ingredient and having a frame and a grinding chamber with powered grinding blades mounted to the frame, a method of grinding the ingredient, comprising the steps of:
   placing a load of unground ingredient into an ingredient hopper with a translucent window;
   releasably mounting the hopper containing the unground ingredient inside a housing with the translucent window aligned with a window opening in the housing to enable viewing into the hopper through the window from outside of the housing when the hopper is mounted inside the housing; and
   dropping unground ingredient from the hopper to a grinding chamber containing powered grinding blades to grind the ingredient; and
   grinding the unground ingredient in the grinding chamber.

47. The method of claim 46 including the steps of
   removing the hopper from the housing to be refilled with ingredient when the view through the window indicates that the level of the ingredient in the hopper has fallen beneath a selected level,
   refilling the hopper with another load of unground ingredient, and
   remounting the hopper inside the housing with the translucent window in the hopper aligned with the window opening in the housing to grind the other load.

48. The method of claim 46 including the steps of
   removing the hopper from the housing when the view through the window indicates-that the level of the ingredient in the hopper has fallen beneath a selected level,
   cleaning the hopper while removed from the housing, and
   after cleaning the hopper, remounting the hopper inside the housing with the window aligned with the window opening to grind the other load.

49. The method of claim 46 in which the window opening is free of a translucent covering except when covered by the translucent of the hopper window when the hopper is mounted inside the housing.

50. The method of claim 46 in which the translucent window is integrally formed with the hopper.

51. The method of claim 46 in which the hopper is substantially, entirely translucent.

52. A food ingredient hopper assembly adapted for use with a food grinder assembly, comprising:
   a manually portable, removable, container shaped body for containing a supply of ingredient to be ground by a mating grinding assembly with which the body is dimensioned for releasable mounted engagement; and a hopper outlet opening at the bottom of the container shaped body;

a hopper outlet closure assembly mounted to the body adjacent to the hopper outlet opening and having
a closure member, and
a mounting assembly attached to the body for mounting the closure member for movement between
a closed position in which the outlet member is blocked closed by the closure member, and
an open position in which the closure member is clear of the outlet opening.

53. The food ingredient hopper assembly of claim 52 including a mounting member attached adjacent to the top of the hopper body and extending outwardly from the side of the body for underlying supportive hanging engagement with a mating, hopper mounting member of the food grinder assembly with which it is adapted for use.

54. The food ingredient hopper assembly of claim 52 in which the mounting assembly includes
a guide member in sliding supportive engagement with the closure member for sliding movement of the closure member along the guide member between the closed position and the open position, and
means for biasing the guide member for movement along the guide member to the closed position.

55. The food ingredient hopper assembly of claim 54 in which the biasing means is a resilient member attached to the closure member to provide a resilient biasing force of sufficient strength to move the closure member to the closed position in the absence of a countervailing force.

56. The ingredient hopper assembly of claim 55 including an external force receiving member attached to the closure member and extending laterally of the hopper outlet opening for engagement by a mating force providing member within the grinding assembly, said pusher receipt member moving the closure member to the open position when the bias force is overcome by an external countervailing force being received by the force receiving member.

57. A food ingredient hopper assembly adapted for use with a food grinder assembly, comprising:
a manually portable, removable, container shaped body for containing a supply of ingredient to be ground by a mating grinding assembly with which the body is dimensioned for releasable mounted engagement; and
said body having an open top, a bottom with a hopper outlet opening and opposite sides that extend between the open top and the outlet opening;
at least one support member extending laterally from at least one of the opposite sides of the body adjacent the open top, said at least one support member having an underside positioned vertically relative to the hopper outlet opening for hanging support of the hopper body from an underlying mating support member of the grinder assembly with the hopper outlet opening in the correct outlet position within the grinder assembly.

58. The food ingredient hopper assembly of claim 57 in which the laterally extending support member includes a down-turned portion.

59. The food ingredient hopper of claim 57 in which the down-turned portions form an acute angle with the opposite sides to which they are mounted.

60. The food ingredient hopper assembly of claim 57 including another support member mounted to another one of the opposite sides.

61. The food ingredient hopper assembly of claim 57 in which the hopper body has other opposite sides and including a third support member extending laterally from at least one of the other opposite sides.

62. In a food ingredient grinder having a grinding chamber and a hopper for containing a supply of unground food ingredient to be passed to the grinding chamber for grinding, a method of grinding, comprising the steps of:
removably mounting the hopper to the housing by hanging the hopper from laterally extending mounting members that extend laterally from the sides of the hopper;
manually removing the hopper from the housing by manually lifting the hopper by the laterally extending mounting members; and
using the laterally extending mounting members as handles to manually carry the hopper to a location spaced from the housing for cleaning or reloading with ingredient.

63. The method of claim 62 in which the mounting members have downwardly turned portions to facilitate mounting and use as handles.

\* \* \* \* \*